United States Patent [19]

Duranleau et al.

[11] 3,925,430
[45] Dec. 9, 1975

[54] PREPARATION OF ALKYLAMIDES

[75] Inventors: Roger G. Duranleau, Ardonia; John M. Larkin, Wappingers Falls, both of N.Y.

[73] Assignee: Texaco Inc., New York, N.Y.

[22] Filed: Dec. 12, 1974

[21] Appl. No.: 532,289

[52] U.S. Cl. ............................ 260/404; 260/561 R
[51] Int. Cl.$^2$ ........................................ C07C 103/02
[58] Field of Search ...................... 260/404, 561 R

[56] References Cited
UNITED STATES PATENTS

| | | |
|---|---|---|
| 3,551,465 | 12/1970 | Ellis .................................. 260/404 |
| 3,562,302 | 2/1971 | Ellis .................................. 260/561 R |
| 3,772,358 | 11/1973 | Lang .................................. 260/404 |
| 3,776,901 | 12/1973 | Kelly et al. ......................... 260/561 R |
| 3,862,185 | 1/1975 | Love et al. .......................... 260/561 R |

*Primary Examiner*—C. Davis
*Attorney, Agent, or Firm*—Thomas H. Whaley; Carl G. Ries; George J. Darsa

[57] ABSTRACT

Alkylamides are prepared by contacting an alpha-nitroketone with an acidic mineral acid salt in a carboxylic acid solvent.

20 Claims, No Drawings

PREPARATION OF ALKYLAMIDES

BACKGROUND OF THE INVENTION

This invention relates to a method of preparing alkylamides from nitroketones. In particular, this invention relates to a catalytic method for preparing alkylamides from alpha-nitroketones.

In the past, alkylamides have been prepared by such classical methods as the amination of carboxylic acids. However, many carboxylic acids are not readily available, particularly the odd carbon number chain fatty acids, and their manufacture from expensive reactants are required. Illustratively, the acids could be produced by oxidizing the corresponding alcohol or by employing a Grignard synthesis, each however requiring costly starting materials. Other methods for preparing alkylamides include the conversion of nitro-nitrosoalkane dimers by reaction with at least molar amounts of an anhydrous mineral acid for relatively short contact times. This method is not commercially attractive inasmuch as the mineral acid is consumed in the course of the reaction and the concentration of the charge in the strong acid must be kept low to avoid explosive reactions. The reaction is also water sensitive and the presence of water causes the alkylamides to be hydrolyzed to acids. Further, the amount of concentrated acid employed requires the use of costly corrosion resistant equipment. A method has now been found whereby a range of individual or mixtures of alkylamides having from two to 51 carbon atoms can be produced in good yields, which method can be conducted in less costly equipment.

SUMMARY OF THE INVENTION

Broadly, this invention contemplates a method of preparing an alkylamide which comprises contacting a nitroketone with an acidic mineral acid salt in the presence of a carboxylic acid solvent.

According to this invention the contemplated alkylamides are prepared from 1-nitro-2-alkanones corresponding to the formula:

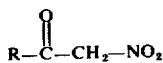

where R is an alkyl group having from one to 50 carbon atoms, preferably five to 30 carbons. Included as starting materials we mention 1-nitro-2-propanone, 1-nitro-2-butanone, 1-nitro-2-pentanone, 1-nitro-2-hexanone, 1-nitro-2-heptanone, 1-nitro-2-octanone, 1-nitro-2-decanone, 1-nitro-2-dodecanone, 1-nitro-2-tetradecanone, 1-nitro-2-pentadecanone, 1-nitro-2-hexadecanone, 1-nitro-2-heptadecanone and 1-nitro-2-heneicosanone. Mixtures of 1-nitro-2-alkanones as starting material are also contemplated and are converted to a mixture of amides. Further, the nitroketones employed in the instant method are terminal alpha-nitroketones where the nitro group is on the terminal carbon and the keto group is on the carbon adjacent thereto. Non-terminal alpha-nitroketones, that is, nitroketones where the nitro group is on other than a terminal carbon atom do not undergo the catalytic conversion to alkylamides as herein more fully described. The nitroketones contemplated as starting materials described above can be prepared in accordance with the procedure described in the art, as for example in U.S. Pat. No. 3,557,166, where the starting material is a 1-olefin. Essentially, this method involves contacting a 1-olefin having from three to 52 carbons at about −40° to 20°C. with dinitrogen tetroxide and oxygen where the reactant mole ratio of olefin to $N_2O_4$ to $O_2$ is between about 1:0.5:1 and 1:1.5:30 thereby forming a nitroalkylperoxy nitrate intermediate and thereafter contacting the nitroperoxy intermediate with a denitrating agent at about 60° to 70°C. employing a mole ratio of denitrating agent to peroxy compound of at least 1:1 and to about 20:1 thereby forming the 1-nitro-2-alkanone.

In particular, the instant method is further explained by the following equation:

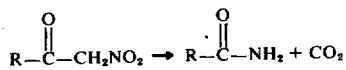

where R is as heretofore defined and where a by-product of the method is carbon dioxide. The reaction evolves carbon dioxide and the by-product formation drives the reaction to completion. It will be appreciated that the alkylamide formed in the course of the catalytic reaction possesses one carbon less than the starting terminal nitroketone and that the conversion reaction involves transformation of the nitroketone through rearrangement and cleavage.

More specifically, the method of this invention comprises catalytically converting a terminal alpha-nitroketone as hereinabove defined, or mixtures of terminal alpha-nitroketones, in the presence of a monocarboxylic acid solvent and as catalyst an acidic mineral acid salt where the conversion is at a temperature of about 90°C. and up to about 190°C. At reaction temperatures below 90°C. the alkylamides are slowly formed and reaction temperatures exceeding 190°C. cause a substantial reduction in the formation of the desired alkylamide and instead acid formation is promoted. Preferably, our catalytic method is undertaken at from about 110° to 150°C.

In one embodiment of this invention there is contemplated a method of converting terminal alpha-nitroketones to alkylamides at the temperatures recited above in the presence of an acidic mineral acid salt catalyst and a low molecular weight monocarboxylic acid as solvent. Acidic mineral acid salts contemplated as catalysts herein include ammonium chloride, ammonium nitrate, ammonium sulfate, ammonium hydrogen sulfate, ammonium phosphate, aluminum nitrate, aluminum sulfate, ferric chloride, cupric nitrate, zinc sulfate and calcium nitrate. Preferably, we employ as acidic mineral acid salt catalysts ammonium hydrogen sulfate, ammonium sulfate, ammonium nitrate and ammonium chloride. In addition, the use of an acidic mineral acid salt catalyst provides the instant method with high yields and selectivity to the alkylamide. The acidic mineral acid salt catalysts employed herein permit the instant method to tolerate amounts of water while deterring substantial hydrolysis of the amide product to the corresponding carboxylic acid. In addition, substantial amounts of water in the reaction mixture may in some instances cause the nitroketone to become insoluble in the solvent. The amount of water causing the loss of solubility of the nitroketone in the solvent will vary depending upon the particular solvent employed and the molecular weight of the nitroketone and the same can be easily determined by experimentation. While it will be understood that the method need not be practiced under substantially anhydrous conditions, we nevertheless prefer that the water content in the reaction be maintained below about 5 percent and particularly below about 3 percent.

In accordance with the inventive method the nitroketone is contacted with an acidic mineral acid salt catalyst in a mole ratio of nitroketone to acidic salt of between about 1:0.01 and 1:2, preferably between about 1:0.1 and 1:1 and in the presence of a carboxylic acid. The carboxylic acid is employed as solvent or reaction medium in the instant method and assists in solubilizing the nitroketone. Suitably, carboxylic acids of from one to 16 carbon atoms can be employed as the reaction medium including formic acid, acetic acid, propionic acid, butanoic acid, isobutanoic acid, pentanoic acid, hexanoic acid, octanoic acid, decanoic acid undecanoic acid, dodecanoic acid, and hexadecanoic acid. Preferably, we employ a carboxylic acid having from one to six carbons, the most preferred acid being acetic acid. The carboxylic acid solvent employed in our method can be present in the reaction in a mole ratio of nitroketone to solvent ranging from 1:1 to 1:100, preferably between about 1:4 and 1:40. These mole ratios permit the nitroketone to be at least partially soluble in the solvent at the reaction temperature set out above. By assuring at least partial solubility of the nitroketone in the carboxylic acid solvent, reaction times are shortened and improved yields of alkylamides are realized. In general, reaction times can range from about one-quarter to 24 hours. The presence of the carboxylic acid solvent is critical to the instant method inasmuch as contacting the nitroketone and catalyst in the absence of the aforementioned solvent provides only a low yield of alkylamide. Further, replacing the carboxylic acid solvent with a non-polar solvent severely curtails the desired amide forming reaction.

Specific examples of the alkylamides prepared according to the inventive method include acetamide, propanamide, butanamide, pentanamide, hexanamide, heptanamide, octanamide, nonanamide, undecanamide, tridecanamide, tetradecanamide, pentadecanamide and eicosanamide.

At the completion of the catalytic reaction the alkylamide can be recovered by cooling the reaction mixture to about 30°C. and isolating the resulting solid by filtration or by diluting the mixture with water at below 60°C. and recovering the crystals of amide. Likewise, the catalyst and low molecular weight carboxylic acid solvent can be recovered by distilling the filtrate. The co-product, carbon dioxide, can be recovered, if desired, in the course of the reaction or at the completion thereof by scrubbing the exit gas with an amine base at room temperature and thereafter thermally decomposing the amine-carbon dioxide complex.

The alkylamides prepared according to the instant method are useful as foam stabilizers in synthetic detergents, ore flotation agents, solvents for waxes, dye solubilizers, plasticizers for polymers, surfactants, dispersants or diluents for reactions, and in the production of carbon paper, rubber and wax paper as well as intermediates in the preparation of fabric water repellants.

In order to more fully illustrate the nature of our invention and the manner of practicing the same, the following examples are presented.

EXAMPLE I

To a solution of 12.0 grams (0.042 mole) of 1-nitro-2-hexadecanone in 86 milliliters of acetic acid there was added 2.5 grams (0.021 mole) of $NH_4HSO_4$. The reaction was conducted for 6 hours at 120°C., thereafter cooled to room temperature and filtered. The crystals ($NH_4HSO_4$) after drying weighed 2.25 grams corresponding to a 90 percent recovery of the catalyst. The filtrate was evaporated to dryness, the residue washed with water and dried under vacuum at room temperature. Analysis of the product, 9.59 grams, indicated 100 percent conversion of the nitroketone with a selectivity of 96 percent to n-pentadecanamide.

EXAMPLE II

To a solution of 12.0 grams (0.042 mole) of 1-nitro-2-hexadecanone in 50 milliliters of acetic acid there was added a mixture of 1.32 gram (0.0115 mole) of ammonium sulfate, 0.95 gram (0.0095 mole) of sulfuric acid and 37 milliliters of acetic acid. The reaction was conducted for 80 minutes at 120°C. and 25 milliliter portions of the product were periodically removed from the reactor, poured into ice water, the solids filtered and dried. Analysis by infrared spectrum indicated about 50 percent conversion of the nitroketone with a selectivity of greater than 95 percent to n-pentadecanamide.

EXAMPLE III

Example I was repeated except 1.76 grams (0.020 mole) of $NH_4NO_3$ were employed as catalyst. Analysis of the product indicated 60 percent conversion of the nitroketone with a selectivity of about 95 percent to n-pentadecanamide.

EXAMPLE IV

Example III was repeated except 3.75 grams (0.042 mole) of $NH_4NO_3$ were employed. Analysis of the product indicated a selectivity of about 50 percent to n-pentadecanamide.

EXAMPLE V

Example I was repeated except 2.25 grams (0.042 mole) to $NH_4Cl$ were employed as catalyst. After cooling to room temperature, the solution was filtered and 11.4 grams of solids collected. Analysis of the product indicated 40 percent conversion to n-pentadecanamide with a selectivity of about 95 percent.

We claim:

1. A method of preparing an alkylamide which comprises contacting a nitroketone with an acidic mineral acid salt as catalyst in the presence of a carboxylic acid solvent.

2. A method according to claim 1 wherein said contacting is at a temperature of about 90°C. to about 190°C.

3. A method according to claim 1 wherein said contacting is a temperature of about 110° to 150°C.

4. A method according to claim 1 wherein the mole ratio of said nitroketone to said catalyst is between 1:0.01 and 1:2.

5. A method according to claim 1 wherein the mole ratio of said nitroketone to said catalyst is between 1:0.1 and 1:1.

6. A method according to claim 1 wherein said nitroketone corresponds to the formula:

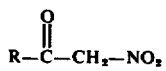

where R is an alkyl group of from one to 50 carbon atoms.

7. A method according to claim 6 wherein R is five to 30 carbons.

8. A method according to claim 1 wherein said nitroketone is 1-nitro-2-hexadecanone.

9. A method according to claim 1 wherein said nitroketone is 1-nitro-2-octadecanone.

10. A method according to claim 1 wherein said carboxylic acid has from one to 16 carbon atoms.

11. A method according to claim 1 wherein said carboxylic acid has from one to six carbon atoms.

12. A method according to claim 1 wherein said carboxylic acid is acetic acid.

13. A method according to claim 1 wherein said acidic salt is ammonium chloride, ammonium nitrate, ammonium sulfate, ammonium hydrogen sulfate, aluminum nitrate, aluminum sulfate, ferric chloride, cupric nitrate, zinc sulfate or calcium nitrate.

14. A method according to claim 1 wherein said acid salt is ammonium hydrogen sulfate.

15. A method according to claim 1 wherein said salt is ammonium chloride.

16. A method according to claim 1 wherein said salt is ammonium sulfate.

17. A method according to claim 1 wherein said salt is ammonium nitrate.

18. A method according to claim 1 wherein said acidic salt is calcium nitrate.

19. A method according to claim 1 wherein said alkylamide is pentadecanamide.

20. A method according to claim 1 wherein said alkylamide is acetamide.

* * * * *